United States Defensive Publication [19] (H) [11] T966,013

Newton et al. [43] Jan. 3, 1978

[54] TRANSITION METAL COMPOUND

[75] Inventors: Alan Branford Newton, Welwyn Garden City; John Edward Priddle, Welwyn, both of England

[73] Assignee: Imperial Chemical Industries Limited, London, England

[21] Appl. No.: 747,383

[22] Filed: Dec. 3, 1976

[30] Foreign Application Priority Data

Jan. 2, 1976 United Kingdom ..... 68/76

[51] Int. Cl.[2] ..... C08F 4/66; C08F 10/06

[52] U.S. Cl. ..... 526/140; 252/429 B; 526/139; 526/351

[57] ABSTRACT

A process is provided in which a solid compound of a transition metal of Groups IVA to VIA is ground with at least one polymeric material containing sulphone groups and containing at least two repeat units of the formula:

$$—Ar—SO_2—$$

in which Ar is a bivalent aromatic radical and may vary from unit to unit in the polymer chain. The Ar radical preferably contains two aromatic rings linked together, as in:

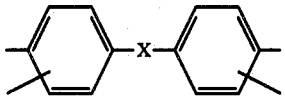

where X is an O or S atom, a direct link or the residue obtained by removing H from each —OH group present in an aromatic diol. If Ar varies the material is a copolymer. The polymeric material can be a polyethersulphone.

The transition metal can be zirconium, vanadium or titanium. Preferably the transition metal compound is a halide such as titanium trichloride.

21 Claims, No Sheets Drawing,

41 Pages Specification

The file of this unexamined application may be inspected and copies thereof may be purchased (849 O.G. 1221, Apr. 9, 1968).